United States Patent [19]

DeHaan

[11] 4,432,746

[45] Feb. 21, 1984

[54] WEB SEGMENTING APPARATUS

[75] Inventor: Dennis A. DeHaan, Cincinnati, Ohio

[73] Assignee: The Procter & Gamble Company, Cincinnati, Ohio

[21] Appl. No.: 265,738

[22] Filed: May 21, 1981

[51] Int. Cl.[3] .................... B65H 45/16; B65H 17/34; B23Q 7/00

[52] U.S. Cl. .................................. 493/359; 83/155.1; 83/176; 83/424; 198/834; 198/850; 493/71; 493/196; 493/227; 493/287; 493/365; 493/432; 226/172

[58] Field of Search ..................... 493/60, 64, 71, 194, 493/196, 202, 227, 287, 236, 235, 340, 345, 346, 359, 365-368, 432, 428, 429; 83/155, 155.1, 176, 350, 424; 198/850, 834; 226/172

[56] References Cited

U.S. PATENT DOCUMENTS 3,483,780 12/1969 Hudson .......................... 83/155.1 X 4,022,456 5/1977 Hooper .............................. 493/357

*Primary Examiner*—A. J. Heinz

*Attorney, Agent, or Firm*—Thomas J. Slone; Fredrick H. Braun; Richard C. Witte

[57] ABSTRACT

An apparatus for segmenting a continuous running web into a stream of discrete articles by cutting the web transversely at uniformly longitudinally spaced intervals; and which apparatus may also effect U-folding of each of the discrete articles. The apparatus is of the type which includes a flight of longitudinally spaced, web engaging friction plates which provide cutter access to the web through spaces intermediate adjacent friction plates. The apparatus further includes a constant clearance infeed nip which is formed in part by the spaced friction plates of the flight passing over a circumferential portion of an infeed roll having circumferentially spaced, radially extending lugs, and which lugs are configured and disposed to engage the web by extending through the spaces intermediate the spaced friction plates. Alternatively, the flight of friction plates may be integrated into a unitary apertured conveyor belt; and the cutter may be integrated into such a constant clearance nip.

9 Claims, 8 Drawing Figures

WEB SEGMENTING APPARATUS

DESCRIPTION

1. TECHNICAL FIELD

This invention relates to apparatus for receiving a continuous web which may be longitudinally elasticized in whole or in part, and segmenting the web into a stream of discrete articles by transversely cutting the web at uniformly longitudinally spaced intervals. Such a web segmenting apparatus may also include means for U-folding the articles about a medial transverse fold line prior to issuing the stream of articles from the apparatus.

2. BACKGROUND ART

A cutter apparatus for pinch-cutting filaments into discrete lengths is disclosed in U.S. Pat. No. 3,483,780 which issued Dec. 16, 1969 to Hudson et al. That apparatus comprises: a pair of feed rollers at the entrance to the cutter to assure constant speed movement of material to be cut; and opposed flights of longitudinally spaced grippers for feeding the material to and away from a cutting zone. The cutter elements contact the web through the spaces between adjacent grippers. However, the feed rollers are serially disposed and spaced with respect to the flights of grippers rather than being integrated therewith to corporately define a composite constant clearance infeed nip and, optionally, a constant clearance cutter nip as provided by the present invention for more positively feeding and controlling a web at least until it is segmented into discrete articles or lengths as provided by the present invention.

An opposed conveyor type machine for cutting designs in sheet material is disclosed in U.S. Pat. No. 1,478,998 which issued Jan. 1, 1924 to W. R. Howard et al. In that machine, the link members of the lower conveyor are female die members, and the link members of the upper conveyor comprise male die members which are sequentially reciprocated by a cam 20 as they pass under the cam.

A Method And Apparatus For Folding And Cutting An Interconnected Web Of Disposable Diapers Or The Like Having Stretched Elastic Leg Bands Secured Thereto is disclosed in U.S. Pat. No. 4,022,456 which issued May 10, 1977 to L. C. Hooper ad G. M. Weber. That apparatus comprises a rotating drum having reciprocating web-edge gripping means for maintaining a partially longitudinally elasticized web under sufficient tension to keep longitudinally extending elastic strands in a stretched condition until the web is cut into discrete disposable diapers and U-folding of them has been initiated. Such disposable diapers are disclosed in U.S. Pat. No. 3,860,003 which issued Jan. 14, 1975 to K. B. Buell, and a Method And Apparatus For Continuously Attaching Discrete, Stretched Elastic Strands To Predetermined Isolated Portions of Disposable Absorbent Products such as a web of such disposable diapers is disclosed in U.S. Pat. No. 4,081,301 which issued Mar. 28, 1978 to K. B. Buell.

A Method Of And Installation For Continuous Manufacture Of Unsewn Articles Of Clothing which are partially elasticized is disclosed in U.S. Pat. No. 3,828,367 which issued Aug. 13, 1974 to A. Bourgeois. As disclosed, a continuous, partially elasticized web is formed, folded, and cut into discrete panels for forming into clothing articles by passing through a series of nips between oppositely disposed rotating machine elements. As compared to the present invention, that apparatus does not comprise, for instance, means for engaging and controlling throughout its length such a longitudinally elasticized web in its longitudinally uncontracted state until U-folding of discrete articles about a transverse medial fold line has commenced. More specifically, it does not comprise constant clearance nip means which are integrated into oppositely disposed conveyors as is provided by the present invention for maintaining positive control of a web being processed by the apparatus.

A wire feeding and cutting apparatus of the opposed conveyor type is disclosed in U.S. Pat. No. 2,053,260 which issued Sept. 8, 1936 to A. E. Blashill. The cutter of that apparatus is, however, carried on a link of the upper conveyor chain. Accordingly, the conveyors of that apparatus have no cutter access openings or an associated composite constant clearance nip comprising rotary elements and opposed conveyor elements as provided by the present invention.

As compared to the background art described above, the constant clearance nips provided by the present invention assure more positive web control in opposed-conveyor type cutting and folding apparatuses: particularly so when the web of interest is partially or wholly longitudinally elasticized, and there is a felt need to maintain the web in an uncontracted state until it has been severed into discrete lengths, and U-folding of each such length has at least been initiated.

DISCLOSURE OF THE INVENTION

In accordance with one aspect of the present invention, an improved apparatus for segmenting a continuous, longitudinally elasticized web into a stream of discrete articles is provided wherein the web is forwarded to a cutting means in a longitudinally stressed, uncontracted state between opposed portions of two endless conveyors. Cutter access is provided between longitudinally adjacent pairs of web engaging friction plates of at least one of the conveyors, and a constant clearance infeed nip is formed at least in part by complimentarily configured and disposed portions of one of the conveyors and an infeed roll: for instance, an apertured conveyor belt and a lug-type infeed roll. The infeed nip may further be defined by complimentarily configured and disposed portions of the second conveyor and a second infeed roll. The apparatus may also include: a second constant clearance nip spaced downstream from the first nip and comprising complimentarily configured and disposed portions of at least one conveyor and another rotating machine member such as, for example, a rotating cutter cylinder; and means for U-folding the discrete articles about a transverse medial fold line prior to issuing the articles from the apparatus.

BRIEF DESCRIPTION OF THE DRAWINGS

While the specification concludes with claims particularly pointing out and distinctly claiming the subject matter regarded as forming the present invention, it is believed the invention will be better understood from the following description taken in conjunction with the accompanying drawings in which:

DETAILED DESCRIPTION OF THE INVENTION

Figure 1:
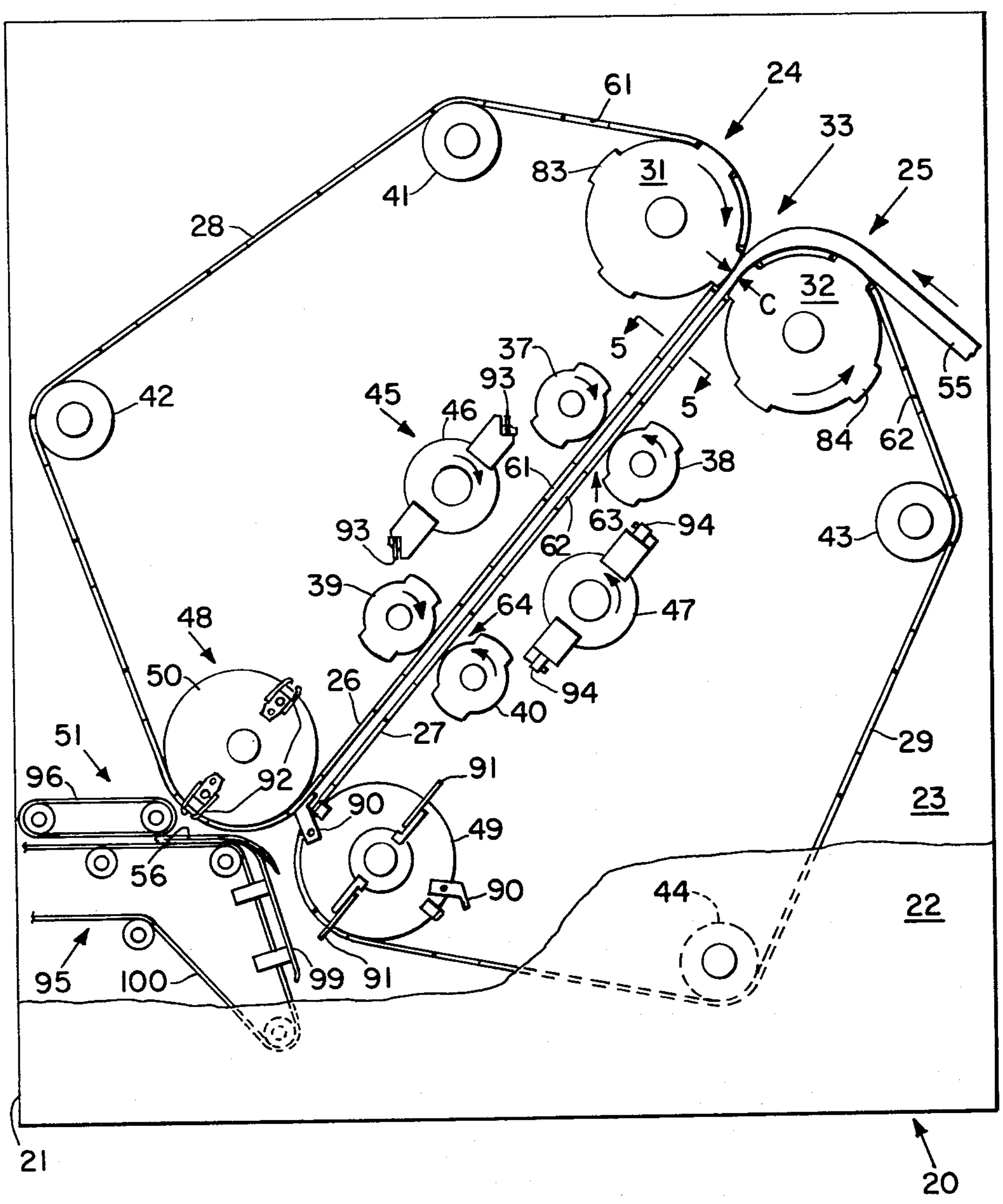
FIG. 1 is a somewhat fragmentary side elevational view of an apparatus for cutting and folding discrete articles from a continuous web which apparatus is an embodiment of the present invention.

An exemplary apparatus 20 embodying the present invention is shown in FIG. 1 to include: a frame 21 comprising a front plate 22 and back plate 23; two endless conveyors 24 and 25 comprising oppositely disposed parallel portions 26 and 27, respectively, endless conveyor belts 28 and 29, infeed rolls 31 and 32, infeed nip 33, back-up rolls 37 through 40, and idler rolls 41 through 44; cutting means 45 comprising a cutter cylinder 46 and an anvil cylinder 47; U-folding means 48 comprising a tucker cylinder 49 and a gripper cylinder 50; and outfeed means 51. The apparatus further comprises drive means not shown for synchronously powering the conveyors 24 and 25, cutting means 45, U-folding means 48, and outfeed means 51 as described hereinafter.

Briefly, apparatus 20 comprises means for and is particularly useful for receiving a continuous running web 55, FIG. 1, which may be partially or wholly longitudinally elasticized in a longitudinally stressed, uncontracted state, and maintaining that state until the web 55 is severed into discrete articles 56 (e.g., disposable diapers) of uniform length, and the discrete articles 56 are at least partially U-folded about a transverse medial fold line. The infeed nip 33 comprises complimentarily configured portions of conveyor belts 28 and 29 and infeed rolls 31 and 32 to provide a constant clearance for continuously and positively engaging and forwarding the web 55 albeit the conveyor belts 28 and 29 have longitudinally spaced cutter access and anvil access openings or apertures 61 and 62, FIGS. 3 and 4, respectively. Additional, similar constant clearance nips 63 and 64 are also defined intermediate back-up rolls 37 and 38, and 39 and 40, respectively, which nips are downstream from infeed nip 33 and contribute to the positive control and forwarding of web 55 and articles 56 at least until the U-folding of each article 56 is commenced.

Figure 2:
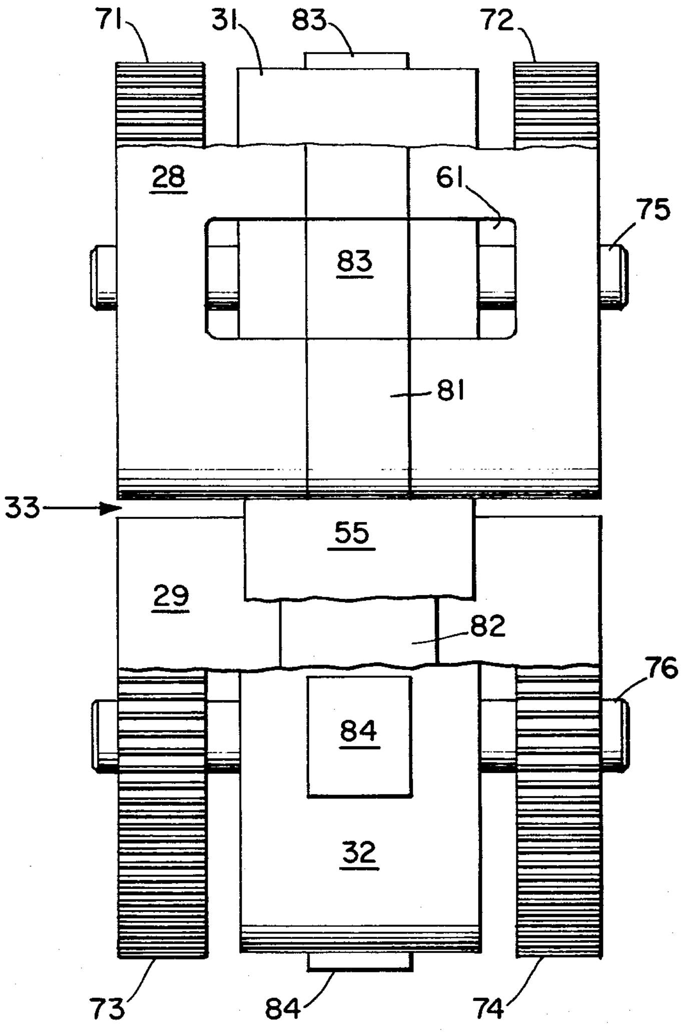
FIG. 2 is an enlarged scale, somewhat fragmentary end view of the infeed nip region of the apparatus shown in FIG. 1.

FIG. 2 is a fragmentary view of the infeed end of apparatus 20 taken along the line of sight indicated by the nip designator arrow 33 in FIG. 1. FIG. 2 shows the infeed nip 33 to be defined by infeed rolls 31 and 32, spline rolls 71 through 74, shafts 75 and 76, and portions of conveyor belts 28 and 29.

Figure 3:
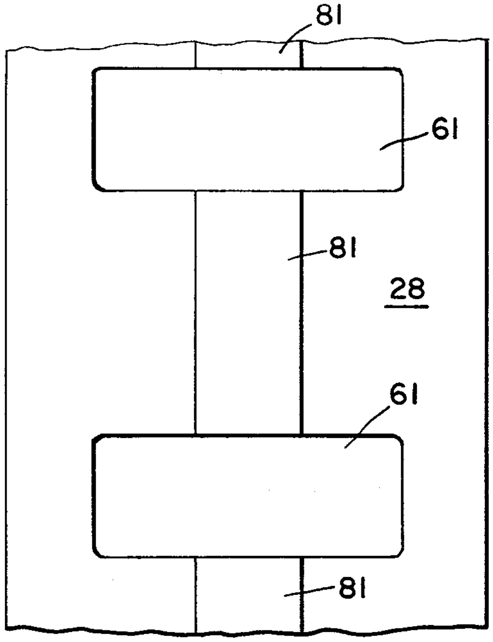
FIGS. 3 and 4 are plan views of fragmentary portions of the top and bottom conveyor belts, respectively, of the apparatus shown in FIG. 1.
Figure 4:
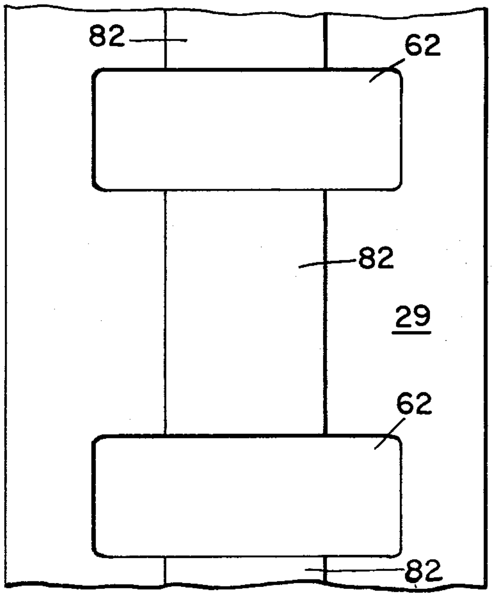

The conveyor belts 28 and 29, FIGS. 3 and 4, respectively, have transversely ribbed backs for positive engagement with the spline rolls 71 through 74, and have longitudinally spaced apertures 61 and 62, respectively, for enabling web access by elements of the cutting means 45 and the U-folding means 48 as described more fully hereinafter. The conveyor belts 28 and 29 are also configured to have raised, longitudinally extending medial ribs 81 and 82, respectively, for functions to be described hereinafter in conjunction with describing FIG. 5.

The infeed rolls 31 and 32 are provided with radially outwardly projecting lugs 83 and 84, respectively, which are configured and circumferentially spaced to extend through the apertures 61 and 62, respectively, in the conveyor belts 28 and 29, respectively, as the infeed rolls 31 and 32 rotate, and the conveyor belts 28 and 29 are driven over circumferential portions thereof as may be seen in FIG. 1.

Still referring to FIG. 2, infeed roll 31 is centrally positioned on shaft 75 intermediate spline rolls 71 and 72. They are spaced on shaft 75 so that the spline rolls 71 and 72 engage the longitudinal edge portions of belt 28, and the lugs 83 on infeed roll 31 engage the apertures 61 in conveyor belt 28. In the same manner, infeed roll 32 is centrally positioned on shaft 76 intermediate spline rolls 73 and 74 for engagement of lugs 84 with the apertures 62 of conveyor belt 29. Means not shown are provided for rotatably mounting the shafts 75 and 76 in the frame 21 of apparatus 20 and for powering their rotation in timed relation: i.e., each lug 83 facing a lug 84 at nip 33 so that, downstream, each aperture 61 in conveyor belt 28 is in registration with an aperture 62 in conveyor belt 29 where the parallel portions of conveyor belts 28 and 29 pass between the cutter cylinder 46 and the anvil cylinder 47. Thus, apertures 61 are alternatively designated cutter access openings, and apertures 62 are alternatively designated anvil access openings although, in fact, the cutter and anvil only operate through alternately spaced apertures 61 and 62, respectively.

Referring again to FIG. 1, this shows the filling relationship between the lugs 83 and 84 of infeed rolls 31 and 32, respectively, and openings 61 and 62 of conveyor belts 28 and 29, respectively which precipitates a constant clearance C for infeed nip 33 as the infeed rolls 31 and 32 are synchronously rotated. That is, the lugs on each infeed roll are as high as the thickness of its respective conveyor belt, and the circumferential lengths of lugs 83 and 84 are equal to the machine direction lengths of apertures 81 and 82, respectively.

Figure 5:
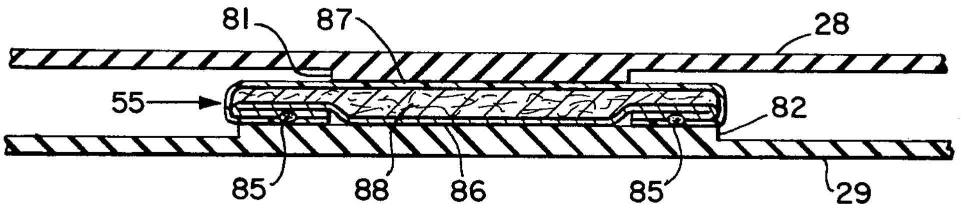
FIG. 5 is a sectional view taken along line 5—5 of FIG. 1.

FIG. 5, taken along line 5—5 of FIG. 1, is a transverse sectional view which shows the medial gripping relation of medial ribs 81 and 82 on web 55. As indicated in FIG. 5, web 55 is longitudinally elasticized by two longitudinally extending, transversely spaced elastic strips 85. Also, as shown, the web 55 is a continuous composite web which further comprises a topsheet 86, a backsheet 87, and an absorbent core 88. This may be identical to the web disclosed in U.S. Pat. No. 4,081,301 and, at this point, the web may be identically C-folded as disclosed in U.S. Pat. No. 4,022,456 which patents have been referenced hereinbefore and are hereby incorporated herein. Thus, as shown in FIG. 5, the medial rib 81 of conveyor belt 28 is sufficiently narrow with respect to the transverse spacing of strips 85 to obviate directly compressively binding them between oppositely disposed machine members: i.e., the medial ribs 81 and 82. This is intended to enable maintaining a predetermined degree of longitudinal stress in web 55 to keep it uncontracted while concommitantly obviating deliterious rammifications with respect to the elastic strips which might otherwise be precipitated by directly compressively binding the elastic strips.

Figure 6:
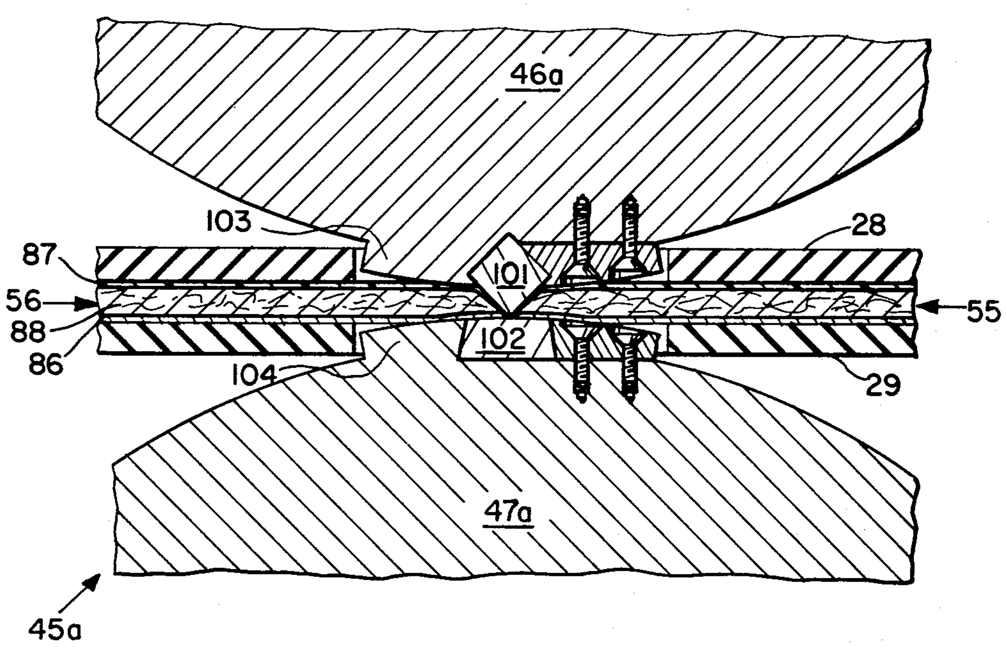
FIG. 6 is an enlarged scale, fragmentary side elevational view of an alternate, constant-clearance-nip cutting means for the apparatus shown in FIG. 1.

Referring again to FIG. 1, cutting means 45 of apparatus 20 comprises cutter cylinder 46 and anvil cylinder 47 which are rotatably secured to the frame and synchronously powered by means not shown so that they co-act to sever the web 55 into discrete lengths: one severance or transverse cut occuring each half-revolution of the cutter and anvil cylinders, with the cutter blades 93 gaining access to the top of web 55 through openings 61 in the top conveyor belt 28, and the anvil blocks 94 gaining access to the bottom of web 55 through openings 62 in bottom conveyor belt 29. Alternatively, whereas the cutter blades 93 and the anvil blocks 94 are mounted on distal ends of cantilevered arms of the cutter cylinder 46 and anvil cylinder 47, respectively, the cutter and anvil cylinders may, as shown in FIG. 6, be lugged cylinders 46a and 47a, respectively, similar to the infeed rolls and have cutter blades 101 and anvil blocks 102 integrated into their respective lugs 103 and 104. This may be done, for instance, in the general manner indicated in FIG. 6. Thus, such a cutting means 45a would constitute another constant clearance nip similar to infeed nip 33 for even greater positive control of web 55. Parenthetically, U.S. Pat. No. 3,483,780 referenced hereinabove shown in FIG. 4 a cutter blade mounted in a lug of a cutter roller and a compatible anvil member mounted in an anvil roller albeit such are not shown or described to be cooperating members of a constant clearance nip as described above.

After each discrete article 56 is severed from web 55, by the action of cutting means 45, FIG. 1, the article is forwarded intermediate conveyor belts 28 and 29 to the U-folding means 48. Preferably, the parallel portions of conveyor belts 28 and 29 are sufficiently tensioned by means not shown and so spaced or biased towards one another to maintain the article 56 in its uncontracted state when cut. The additional constant clearance nip 64 intermediate back-up rolls 39 and 40 contributes further to maintaining the article 56 in its uncontracted state.

The U-folding means 48, FIG. 1, comprises a tucker cylinder 49 and a gripper cylinder 50 as stated hereinabove which cooperate to U-fold each discrete article 56 about its transverse medial portion, and forward a stream of such U-folded articles to the take-away conveyor 95.

Figure 7:
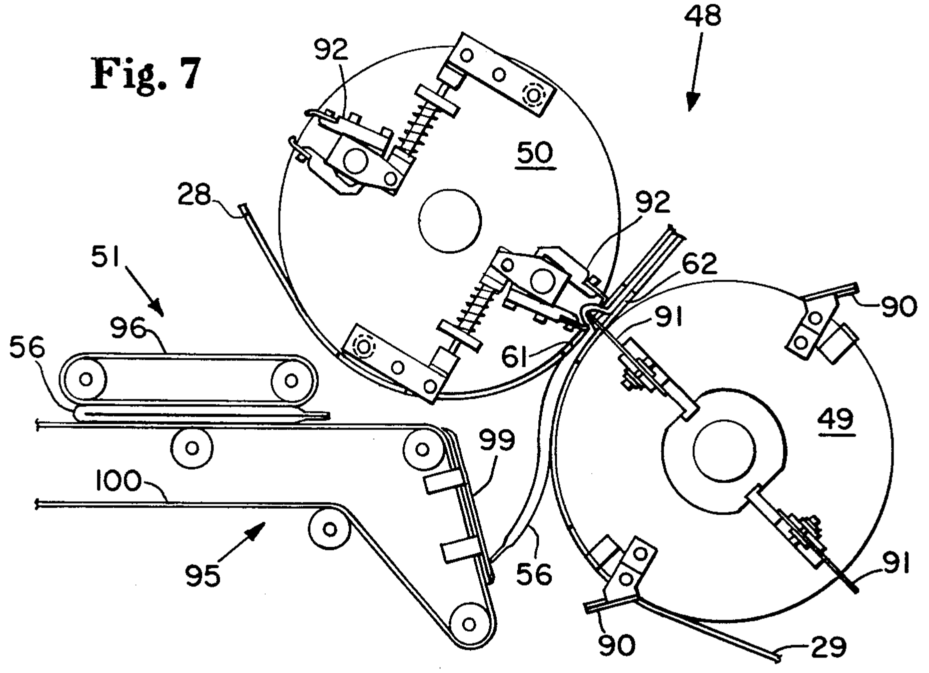
FIGS. 7 and 8 are enlarged scale, sequential fragmentary side elevational views of the U-folding and outfeed portions of the apparatus shown in FIG. 1.
Figure 8:
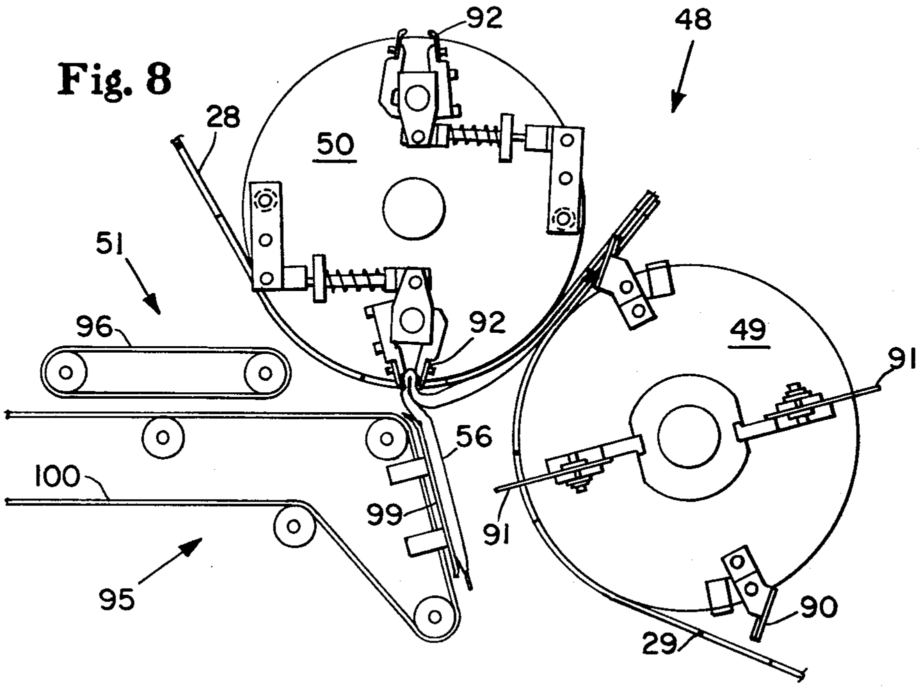

Tucker cylinder 49 comprises two diametrically opposed leading edge grippers 90, and two diametrically opposed tuckers 91. The gripper cylinder 50 comprises two medial fold grippers 92 which are disposed 180 degrees apart on the periphery of the cylinder. The tucker and gripper cylinders are so rotationally indexed with each other and the openings in the conveyor belts, and are provided with means such as camming means for operating the grippers 90 and 92, and the tuckers 91 for repeatedly doing the following: as shown in FIG. 1, grip the transverse leading edge portion of article 56 with a gripper 90 through a lower conveyor belt opening 62 when the leading edge of the article reaches the nip intermediate the tucker and gripper cylinders 49 and 50; then, as shown in FIG. 7, move a tucker 91 radially outwardly through another opening 62 to tuck a transverse medial portion of the article 56 between the jaws of a gripper 92 mounted on the gripper cylinder 50; close gripper 92 to grip the transverse medial portion of the article 56; release the leading edge of the article 56 from gripper 90 when it reaches about the 8 o'clock position of the tucker cylinder 49; and open gripper 92 to release the medial fold or nose portion of article 56 just after it passes the position shown in FIG. 8 so that the U-folded article is deposited nose first on the take-away conveyor 95 of the outfeed means 51.

Referring again to FIG. 1, the outfeed means 51 comprises a take-away conveyor 95 and a caliper control conveyor 96 which are so configured and disposed, and synchronously driven with respect to the conveyors 24 and 25, cutting means 45, and U-folding means 48 that articles 56 are serially received from the U-folding means 48 as described above, and then calendered to provide a predetermined nominal caliper or thickness for each article to facilitate downstream packaging. The take-away conveyor 95 also comprises a dead-plate 99 which obviates the leading half of each article from contacting the take-away conveyor belt 100 which might otherwise cause the leading half portion of the article to bunch up in the nip between the take-away conveyor 95 and the gripper cylinder 50, FIG. 8.

Thus, as described above, apparatus 20 comprises means for receiving a longitudinally elasticized web in a longitudinally stressed, uncontracted state, and maintaining that uncontracted state until the web is transversely severed to form discrete articles; and each discrete article is at least partially U-folded about a transverse medial fold line. The constant clearance nips, particularly infeed nip 33, are believed to be particularly instrumental in effecting and maintaining control of the web. Additionally, apparatus 50 comprises means for completing the U-folding and calendering of each article so that, ultimately apparatus 20 converts a continuous, at least partially longitudinally elasticized web into a stream of uniform, U-folded articles: for instance, disposable diapers having elasticized leg flaps as disclosed in U.S. Pat. No. 3,860,003 as referenced hereinbefore.

While apparatus 20 has been described as comprising endless conveyors 24 and 25 which, in turn, comprise conveyor belts 28 and 29, respectively, either or both of the endless conveyors 24 and 25 may alternatively comprise a flight of web engaging friction plates which are longitudinally spaced to define cutter and or anvil access openings between adjacent plates. Indeed, each of the conveyor belts 28 and 29 as described above effectively comprises a flight of such plates and coupling means for coupling the plates into an endless loop. Moreover, the lower conveyor belt may comprise means for supporting the web 55 as it is being cut thus obviating the need for the openings 62 in the lower conveyor belt 29, the lugs 84 on infeed roll 32, and the rotating anvil cylinder 47. Thus, for instance, the top half of the constant clearance infeed nip 33 may be corporately defined by the apertured upper conveyor belt 28 and the lugged top infeed roll 31 while the bottom half of nip 33 may be defined by such means as a non-apertured lower conveyor belt which is backed by a smooth lower infeed roll. In this alternative, of course, the lugged lower back-up rolls 38 and 40 would also necessarily be replaced by smooth rolls.

While particular embodiments and alternatives of the present invention have been illustrated and described, it would be obvious to those skilled in the art that various other changes and modifications can be made without departing from the spirit and scope of the invention. It is intended to cover in the appended claims all such changes and modifications that are within the scope of this invention.

What is claimed is:

1. Apparatus for segmenting a web into discrete articles which apparatus comprises a frame, a positive web translation means for receiving and forwarding a web in a predetermined and substantially uniform state of longitudinal stress, and cutting means operatively associated with said translation means to segment said web downstream from an infeed end of said translation means into a stream of discrete articles having substantially uniform machine direction lengths, said translation means comprising a first endless conveyor and a second endless conveyor having runs in parallel opposed relation, said first endless conveyor comprising a flight of web engaging friction plates which are longitudinally spaced to define cutter access openings between adjacent pairs of said plates, and a rotatably mounted and powered infeed roll having one or more radially outwardly projecting lugs which lugs are configured and disposed to extend into and substantially fill each of said cutter access openings of said flight to engage said web as said infeed roll rotates and said flight is driven over a circumferential portion of said infeed roll, said friction plates and said infeed roll being complimentarily configured to corporately define one half of a constant clearance infeed nip disposed at said infeed end of said translation means, said cutter access openings constituting means for said cutter means to effect said segmenting.

2. The apparatus of claim 1 wherein said translation means comprises a rotatably mounted and powered second infeed roll, said cutting means comprises a cutter and an anvil disposed in opposing relation, and said second endless conveyor comprises a second flight of web engaging friction plates, said second flight of web engaging friction plates being configured and disposed to define longitudinally spaced anvil access openings where oppositely disposed portions of said flights pass between said cutter and said anvil, said second infeed roll being configured and disposed to also have one or more lugs which will extend through each of said anvil access openings as said second infeed roll rotates and said second flight is driven over a circumferential portion of said second infeed roll at said infeed nip.

3. The apparatus of claim 1 or 2 wherein said web translation means further comprises means defining a second composite constant clearance nip downstream from said infeed nip and means for powering said nips synchronously.

4. The apparatus of claim 3 wherein said cutting means and said means defining a second composite constant clearance nip are integrated into a unitary assembly.

5. The apparatus of claim 1 or 2 further comprising means for coupling together the web engaging friction plates of at least one said flight into an endless conveyor belt having uniformly longitudinally spaced apertures, said apertures comprising said openings.

6. The apparatus of claim 1 or 2 wherein said lugs of said infeed rolls comprise material having substantially identical resiliency and frictional properties as said web engaging friction plates.

7. The apparatus of claim 1 or 2 further comprising means for at least initiating U-folding each of said discrete articles about a transverse fold line while maintaining said predetermined state of longitudinal stress.

8. The apparatus of claim 1 or 2 wherein said web is longitudinally elasticized by virtue of comprising a longitudinally extending elastic member affixed to a substantially inelastic substrate, said predetermined stress being sufficient to extend said web to the full pre-elasticized, uncontracted length of said substrate, and said web translation means being configured to substantially obviate compressively binding said elastic member directly between opposed members of said apparatus.

9. The apparatus of claim 8 wherein said web is longitudinally elasticized by two longitudinally extending elastic members which are transversely spaced a predetermined distance, and said web engaging friction plates and said lugs have longitudinally extending portions which are sufficiently narrower with respect to said predetermined distance, and so transversely disposed and sufficiently high to substantially obviate compressively binding either of said elastic members directly between opposed members of said apparatus.

* * * * *

UNITED STATES PATENT AND TRADEMARK OFFICE

CERTIFICATE OF CORRECTION

PATENT NO. : 4,432,746

DATED : February 21, 1984

INVENTOR(S) : Dennis A. DeHaan

It is certified that error appears in the above-identified patent and that said Letters Patent are hereby corrected as shown below:

Column 4, line 42, "81 and 82" should read --61 and 62--.

Column 5, line 22, "shown" should read --shows--.

Signed and Sealed this

*Sixteenth* Day of *April 1985*

[SEAL]

*Attest:*

DONALD J. QUIGG

*Attesting Officer* *Acting Commissioner of Patents and Trademarks*